Figure 1:
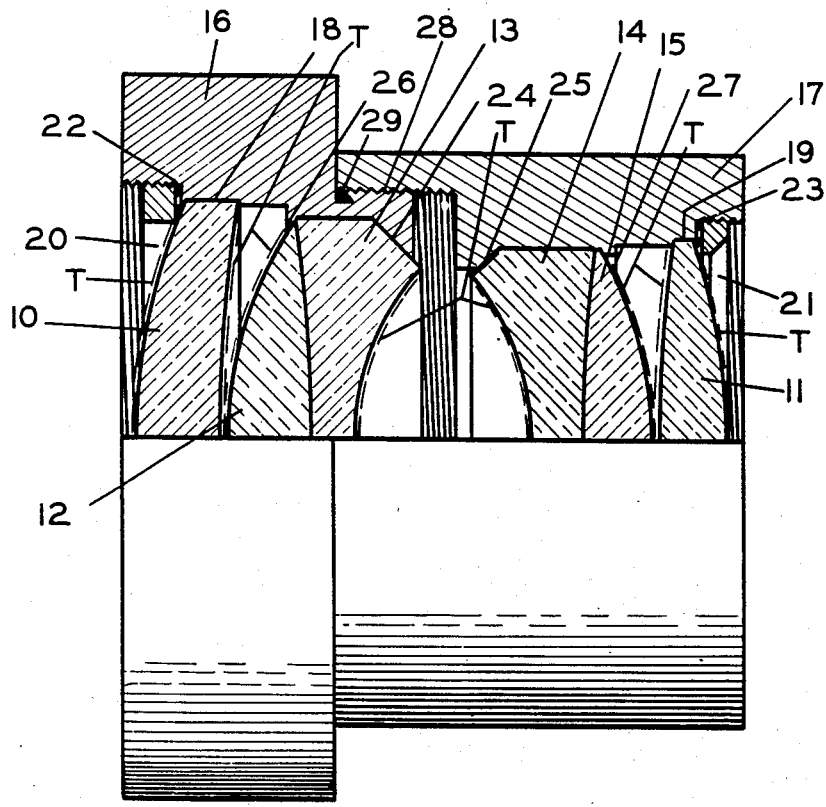

May 12, 1942. W. B. RAYTON 2,282,677
OPTICAL SYSTEM
Filed May 4, 1940

T = TRANSMISSION FILM

WILBUR B. RAYTON
INVENTOR

Patented May 12, 1942

2,282,677

UNITED STATES PATENT OFFICE 2,282,677

OPTICAL SYSTEM

Wilbur B. Rayton, Rochester, N. Y., assignor to Bausch & Lomb Optical Company, Rochester, N. Y., a corporation of New York Application May 4, 1940, Serial No. 333,381

1 Claim. (Cl. 88—1)

The invention relates to a lens system and more particularly has reference to a system employing lens components having transmission films provided upon their air-contacting surfaces.

As is well known, the light transmission of a lens increases with the decrease of light reflected by it. Several methods have heretofore been devised for the treatment of lenses whereby a substantial decrease in their surface reflectivity has been afforded. While the just-mentioned methods are successful from the standpoint that they will produce a lens having the property of high and increased light transmission, it is difficult to put such methods or the products produced under them into practical use due to their limited scope of application and to inherent disadvantages possesed by certain products treated in accordance with their teachings.

It is hence the major object of this invention to provide a novel compound lens system having an extremely high light transmission power.

An equally important object of this invention is to provide a lens system permitting the practical and effective employment of lens components which have been treated to increase their normal light transmission.

Another object of the invention is the provision of a lens system employing lens components having transmission films on their air-contacting surfaces which decrease the surface reflectivity of each lens component.

Yet another object of the invention is the provision in a compound lens system of an arrangement of the lens components thereof which allows full use of the benefits derived from the employment of lens components which have been chemically and physically treated to provide a transmission film on their air-contacting surfaces.

A still further object of the invention is the combination with a lens system employing lens components having a transmission film on their air-contacting surfaces, of a mounting for the lens components which permits them to be mounted in special relation to each other.

With these and other objects in view, which may be incident to these improvements, the invention consists in the parts and combinations to be hereinafter set forth and claimed, with the understanding that the several necessary elements comprising the invention may be varied in construction, proportion and arrangement without departing from the spirit or the scope thereof.

One manner of practically effecting the major concept of the invention, namely, the provision of a lens system having increased light transmission powers, is through the use of lens components which have been chemically or physically treated to provide or create a transmission film of transparent material upon their air-contacting surfaces. It has been discovered that such a film, which consists of a transparent material having an extremely low refractive index, materially reduces light transmission losses caused by surface reflection. However, as already mentioned, some treated lenses possess certain undesirable characteristics. For example, transmission films which are deposited or coated by physical means are not an integral part of the lens surface, are not durable or abrasive resistant but are in fact removable and are easily scratched or damaged, in some instances even by finger marking. On the other hand, while a chemically treated lens is provided with an integral and durable film layer on its surface, the scope of application of the chemical process is limited. Thus the invention has for a further concept, the provision, in a lens system employing lens components having different types of transmission films, of a novel arrangement of the components so as to allow their use in the most effective manner.

In order to make the invention more clearly understood, there is shown in the accompanying drawing, means for carrying the same into practical effect without limiting the improvements in their useful applications to the particular constructions, which for the purpose of explanation, have been made the subject of illustration.

In the drawing:

Figure 1 is a side elevation, partly in section, showing the lens components of a compound lens system mounted within a lens holder or lens mount.

In the drawing, wherein like reference numerals refer to similar parts, there is shown a compound lens system comprised of the outer lens components 10 and 11 between which one or more intermediate lens components may be arranged. For the purpose of illustration two intermediate compound components have been shown, although it will be realized that if desired the intermediate components could be composed of two single components or of a single and a compound component. These latter are formed, respectively, of the elements 12 and 13 and 14 and 15 which are cemented together at their contacting surfaces with a transparent cement such as Canada balsam.

In the embodiment disclosed, the end lens components 10 and 11 are formed of light barium crown glass while the intermediate compound component nearest the forward single component 10 has its element 12 formed of light barium crown and its element 13 of light flint glass and the other intermediate compound component has its element 14 formed of dense barium flint glass and its element 15 of light barium crown glass. Although specific kinds and types of optical glass having certain general compositions have been described, it will nevertheless be appreciated that such have been given for the purpose of illustrating the practice of the invention, which may be carried out with equal success when using different kinds and types of glass having different compositions.

As is well known, the light energy falling upon a glass surface is divided into two parts, a smaller which is reflected back into the original medium and a larger part which continues into the glass and is refracted. It has been discovered that glass elements which have become tarnished have an increased light transmission due to the tarnished surface decreasing the reflection of the incident light falling upon the element. Actually this tarnish has been found to be a film of transparent material which has a refractive index less than that of the glass. A transmission film such as that just mentioned may be provided on the surface of glass elements by subjecting them to chemical or physical treatment. In theory a transmission film must meet two conditions to reduce the reflection to zero for a particular wave length of light. These conditions are (1) that the index of refraction of the transmission film must be equal to the square root of the index of refraction of the glass element and (2) that the transmission film must have an optical thickness of one quarter ($\frac{1}{4}$) the wave length of the incident light. While it is difficult to exactly fulfill the first condition, because to do so would require a film having an abnormally low refractive index, even a rough and approximate satisfaction of this condition will make it possible to obtain a marked decrease in reflection. The second condition is the more important and although it is exactly fulfilled for only one wave length in the spectral range used for most visual purposes, will nevertheless greatly reduce reflection.

Reflection losses are dependent upon the kind and type of glass and the kind of light employed. For white light, reflection loss on each air surface of crown glass roughly amounts to 4% of the incident light with the loss on each air surface of flint glass amounting to approximately 6% of the incident light. In a lens component with two air glass surfaces it will be appreciated that the losses just mentioned occur on each surface so that for a singlet of crown glass, total transmission would be 92% of the incident light while a flint glass singlet would transmit only 88% of the incident light and a doublet formed of a flint and a crown element would transmit 90% of the incident light. The losses just described occur at each air-contacting surface of each component of a compound lens system and hence are cumulative for the whole system. Even where there are only eight air-contacting surfaces, as shown in the drawing, the importance of decreasing reflection so as to increase total light transmission will be well appreciated especially when it is considered that due to reflection losses only about 70% of the incident light is transmitted by the system.

Transparent transmission films of the desired optical thickness and the desired refractive index and such as those described may be created upon glass optical surfaces by both chemical and physical processes. In the former method the cleaned and polished lens to be treated, is immersed in a bath of a substance or compound which will remove the high refractive index oxides from the glass, such as barium and lead, but which will not remove the silica. Such treatment apparently leaches the lead and barium from the original surface of the glass and leaves a transparent film in its place, which film would seem to contain a high percentage of silica. This apparent coat of hydrated silicates, etched upon the air-contacting surfaces of the lens, provides a transparent transmission film having an index of refraction at least roughly approaching that required to reduce surface reflection.

The practice just described of immersing a lens in the treating bath, results in producing a transmission film on all of its surfaces. In certain instances this is undesirable. The simplest manner to overcome this disadvantage of treatment, although it is commercially impracticable, is by the use of a resist coating or mask on any surface which is to remain untreated.

Solutions which may be employed for providing a transmission film include those formed of nitric, acetic, boric and phosphoric acids, acid sodium phosphate, and copper, nickel and ferric sulphates. Formation of a transmission film of the desired thickness by immersing a particular glass in a treating solution is controlled as known to the art by proper time-temperature-concentration relations for the particular kind and type of glass undergoing treatment and for the treating solution employed. Usually these relations are selected to produce a transmission film having a thickness of one quarter ($\frac{1}{4}$) the mean wave length of light for the spectral range to be transmitted, although it will be appreciated that variation in the thickness of the film may be obtained by variation of the controlling relations. When the foregoing condition is satisfied, light reflected by an air-glass surface treated for the visual range as noted will have a magenta color or hue when viewed in white light.

With reference to the control relationships, it should be noted that the time of treatment to obtain a transmission film of the desired one quarter ($\frac{1}{4}$) wave length thickness may vary from 3 minutes to 9 or more hours depending upon the kind and type of glass treated and upon whether cold or hot acid is employed. Wide variations in the concentration of the treating solution may be made without affecting the time and temperature relation for a particular kind and type of glass. In general, effective results may be obtained by using a 1% to 2% concentration of any of the above noted solutions. As one specific illustration of the chemical treatment, it is pointed out that lenses of light barium crown glass, such as those employed in this invention, have been successfully treated to reduce reflection by immersing them in and subjecting them to the action of 1% nitric acid for 10 minutes at 70° C. Similar results were obtained when similar lenses were treated with a like solution for one hour at 50° C. and for 9 hours at 25° C.

One of the physical methods for providing or creating transmission films involves the evaporation of metallic fluorides in a vacuum so that the evaporated molecules travel without intermolecular collision from a heated source to the colder surface of the glass where they are deposited thereon. Suitable fluorides include lithium, magnesium, calcium and sodium fluorides as well as chiolite and cryolite, the double fluoride of aluminum and sodium, which latter fluoride is one of the most convenient fluorides to employ. In operation the polished and cleaned lens to be treated is placed in a suitable container which is then exhausted of air. Cryolite, or any of the other fluorides mentioned, which has been heated to a high temperature is then evaporated within the container until the lens has been provided with a transmission film of a thickness of one quarter (¼) the mean wave length for light in the spectral range employed. Such a condition is readily determined by observation and is reached when light of a magenta hue is reflected by the treated surface when such surface is viewed in white light. After completion of the film, the vacuum is broken and the lens removed from the container. Due to the nature of the evaporation process, only one surface of the lens is coated with each treatment. Where it is desired to treat a second surface, the lens is repositioned so that the untreated surface may be in the line of travel of the evaporated molecules of the film forming material and the steps described are repeated.

Another physical method for reducing reflection depends upon a deposited or built up and skeletonized transmission film upon an air-glass surface. These films which are composed of a fatty acid and the soap of a fatty acid are built up by dipping a glass element into a water solution of a metallic salt upon the surface of which there is spread a monolayer of the fatty acid employed. Each full immersion and withdrawal of the glass element adds two layers of film, each one molecule thick, to the air-glass surfaces of the element. This film is built up of the number of layers necessary to leave a film of the desired one-quarter (¼) wave length thickness after it has been skeletonized by partially dissolving the fatty acid from it a suitable solvent. A film of this nature which possesses the thickness heretofore mentioned also reflects light of a magenta hue when viewed under white light.

Formation of the film may be effected by dipping a glass element into stearic acid spread upon a bath of barium or other chloride. Films may also be constructed with arachidic acid in a bath of cadmium chloride, sodium acetate and hydrochloric acid while if desired potassium cyanide can be added thereto to remove traces of copper ions. Solvents for dissolving out the acid of the film include alcohol, acetone and benzene as well as various mixtures thereof.

Complete immersion of the element being treated provides a transmission film on all of its air-glass surfaces. Provision of a film on one specific surface of an element may be controlled by dipping only that surface in the treating bath or the entire element may be dipped and the film wiped or rubbed off of those surfaces which are to be employed in an uncoated state.

Obviously, any of the methods disclosed may be employed to provide transmission films on the surfaces of singlets, such as the lens components 10 and 11, and if desired a combination of the physical and chemical methods may be used for treating opposite surfaces of the same singlet. while such last-mentioned practice leads to an expensive product, it may be accomplished through the use of a resist coating, for example, styrene resin lacquer, upon one surface during chemical treatment of the other surface, after which the resist coating is removed and the untreated surface may then have a transmission film provided thereon by the physical means heretofore described.

Several conditions must, however, be considered in connection with applying transmission films upon the air-contacting surfaces of doublets such as the intermediate lens components shown in the drawing. These components are formed of the cemented elements 12 and 13 and the cemented elements 14 and 15. It is known that reflection loss is negligible at cemented surfaces where these surfaces are left untreated. On the other hand, experiments and tests conducted in the making of this invention have disclosed that reflection losses at cemented surfaces which have been treated, greatly decrease the light transmission efficiency of a compound lens and the system in which it is employed.

Recognizing that it is undesirable to treat surfaces which are to be cemented, the physical methods described provide highly practical and effective means for creating a transmission film upon the air-glass surfaces of compound elements such as those in doublets shows. Either of the physical methods, due to the technique involved in their practice, may be readily employed so that a film is provided on only one of several surfaces of a lens or lens element thus making it unnecessary to use a resist coating, with its attendant increase in cost for the product, on any surface which is to remain untreated. The physical methods, it will be appreciated, thus allow treatment of a completely assembled and cemented lens or with equal facility permit the creation of a transmission film on one surface of each separate element of a compound lens before the cementing of the elements. Of course, all or only one of the elements of a compound lens may be chemically treated to provide them with transmission films. However, the expensive practice of providing a resist coating on each outer lens element of the lens must be employed in order to prevent treatment of its surface which is to be cemented.

Excellent results assuring increased light transmission for lenses may be obtained by subjecting them to the chemical or physical treatment heretofore described. However, practical use of these processes and the products produced by them is limited by reason of their scope of application and also because some of the products so produced possess certain inherent disadvantages.

For example, the chemical treatment has the advantage of producing a permanent and durable transmission film which is integral with the lens surface. In addition this film will withstand normal atmospheric conditions and will not be removed by average physical contact or rubbing. However, the chemical method cannot be successfully used to treat every piece of glass upon which it could be expected to form a transmission film. This fact is apparently due to the molecular surface condition of the untreated glass as distinguished from the presence of foreign substances, such as dirt and dust, upon the lens surface. As one illustration of this just-mentioned disadvantage, it should be noted that in practically all instances freshly polished lenses may be successfully treated or etched, while it is frequently impossible to obtain the benefits of this treatment upon lenses which have aged under average atmospheric conditions for as little as a month's time after they have been polished. With lenses having an unsatisfactory surface condition, chemical treatment will either be completely ineffective or will provide a film which is unevenly distributed over the lens, both as to area and thickness. Thus it will be appreciated that even with careful selection of the lenses to be treated, the success of such treatment is entirely dependent upon the surface condition of the lenses themselves. Another disadvantage of the chemical treatment resides in the fact that it is limited to use with certain kinds of glass, namely, glass whose high refractive index oxides such as barium or lead may be dissolved by the treatment. As already mentioned, the cemented surfaces of compound lenses should be left in an untreated condition. In this connection a lens which has been subjected to chemical treatment in a normal manner is defective in that it has a transmission film upon each of its air-contacting surfaces. While this defect may be overcome by treating only one surface of the lens, such practice is commercially impracticable, so that application of this type of treatment is limited to singlets.

Although transmission films may be deposited or coated upon any kind and type of glass by making use of the physical processes heretofore described, such films have the decided and serious defect that they are not durable or abrasive resistant. Films of this nature while remaining substantially unaffected by usual atmospheric conditions for long time periods, are nevertheless easily removable as, for example, by wiping or rubbing and in some instances are even damaged by finger marking. Consequently, it is impossible to properly clean and care for lenses with deposited transmission films upon their air-contacting surfaces or to subject them to the ordinary handling and usage received by untreated lenses. At the same time the physical methods afford excellent means for treating compound lenses, since they can be employed without the necessity of a mask either before or after the elements are cemented together and thus permit of simple commercial practice.

Recognizing the benefits to be derived by the use of transmission films, the limited scope of application for the methods of providing such films and also the defects in the products resulting from such methods, the invention obtains the full benefit and enjoyment of increased light transmission in a simple and practical manner by making use of a lens system which permits special arrangement of the components thereof in a way designed to effectively overcome and eliminate the disadvantages mentioned. To this end there is provided a lens system having outer or end lens components in the form of singlets which have a chemically formed transmission film upon their air-contacting surfaces as indicated by the dotted lines T in the drawing and between which outer components are arranged intermediate lens components in the form of doublets, these latter having physically applied transmission films upon their air-contacting surfaces which are also indicated by dotted lines T. Keeping this arrangement of the system, each component thereof is mounted within a tubular lens holder which is then sealed against the entrance of gas, liquid or other foreign substance.

It will be appreciated that by this practice the components with the durable films are located at the positions most likely to receive the full effects of rough physical contact and handling while components with easily removable films are maintained in protected positions secure from damage. At the same time this arrangement permits the employment of the simplest method for providing a film upon a compound lens component since the doublets are the intermediate components of the system and as mentioned are positioned in protected locations.

For realization of the full benefits of the lens system and its particular arrangement of components to overcome the disadvantages and difficulties encountered in providing and using lens components with applied transmission films, the outer lens component 10 is mounted in the forward mounting 16 of a two piece tubular lens holder while the other outer lens component 11 is mounted in the rear mount 17 of the holder. A seat 18 is provided in the forward mount for the lens component 10 which latter is maintained in its seat by means of the retaining ring 20. Ring 20 is threaded to cooperate with internal threads within the forward mount. A seal 22 is provided between the retaining ring and the outer surface of the lens component 10 for the purpose of sealing the interior of the lens holder from the entrance of foreign substances, or liquids or gases. The other outer lens component is similarly mounted within a seat 19 in the rear mount 17 and is held therein by the screw threaded retaining ring 21. This end of the lens holder is also sealed by use of a suitable ring seal 23.

Lens seats 24 and 25 are provided, respectively, in the forward and rear lens mounts for seating the intermediate lens components. As shown, each intermediate lens component is retained in its seat by providing a flange or shoulder 26 and 27 on the end of each seat adjacent the outer lens components, these shoulders being spun from the metal of the lens mounts after the each intermediate lens has been seated. Of course, in place of this securing means, a retainer ring construction similar to that already described can be employed if desired.

The separate lens mounts 16 and 17 are joined together to form an elongated tubular holder for the lens system through the use of screw threaded securing means 28 at the adjacent ends of each mount. To provide a gas, liquid and dirt-proof union for the mounts, a suitable seal 29 is employed between them. It should be observed that this seal together with the seals 22 and 23 completely seal the assembled lens holder against the entrance of any gas, liquid or foreign substances such as dirt and dust. In actual practice it has been found desirable to maintain a tightly screwed connection between the lens mounts. For this purpose, the mounts are screwed or turned together with force so that it is impossible to disassemble them without the use of tools.

In providing an improved compound lens system together with means permitting its practical use and enjoyment in many optical fields, it will be appreciated that the heretofore set forth aims and objects of the invention have been accomplished and attained. Obviously, light transmission and hence the efficiency of the lens system is increased by providing a transparent film on the surfaces of its lens components to reduce reflection losses. However, the present invention goes beyond this in recognizing that practical employment of transparent films is limited by the difficulties encountered in producing them and in inherent defects in the films themselves and for overcoming these disadvantages goes still a step farther by employing an unusual arrangement and mounting for the lens components. Not only does the invention through use of specially treated lens components afford a system having the desired high degree of light transmitting efficiency, but the arrangement and mounting of the lens components assures the maintenance of such a lens system by protecting its components from the damage and harm which could be expected to arise in normal everyday employment and handling.

While there has been shown and described the preferred embodiment of the invention, it is to be understood that the invention is not confined to the precise details of construction herein set forth by way of illustration, as it is apparent that many changes and variations may be made therein, by those skilled in the art, without departing from the spirit of the invention or exceeding the scope of the appended claim.

It is claimed:

A lens system comprising a tubular open ended mount for holding a plurality of lens components in spaced apart relation, an outer lens component located at each end of said mount, each outer lens component being formed of refractive material of the character having high refractive index oxides in its composition and being provided with polished air-contacting surfaces from each of which surfaces high refractive index oxides have been removed by chemical treatment to leave a transparent film thereon, a compound lens component located between the outer lens components, said compound lens component comprising a plurality of elements each formed of refractive material and each having two aligned and polished optical surfaces, said elements being adjacently positioned to have a polished surface of each element in contact with a polished surface of the adjacent element whereby the polished surfaces which provide the respective ends of said compound lens component are in contact with the air, the air-contacting surfaces of said compound lens component being each provided with a physical deposit of transparent material in the form of a film which has been deposited only on the air-contacting surfaces so as to leave the adjacent contacting surfaces of each element of said compound lens component unfilmed but cemented to each other, each of said films having an optical thickness substantially equal to one-fourth the wavelength of light for a particular wavelength in the spectral range to be transmitted through the lens system and an index of refraction less than that of the air-contacting surface with which it is associated.

WILBUR B. RAYTON.